United States Patent
Yoon et al.

(10) Patent No.: US 11,420,185 B2
(45) Date of Patent: Aug. 23, 2022

(54) PREPARATION METHOD FOR SUPER ABSORBENT POLYMER SHEET, SUPER ABSORBENT POLYMER SHEET PREPARED THEREFROM

(71) Applicant: LG Chem, Ltd., Seoul (KR)

(72) Inventors: Ki Youl Yoon, Daejeon (KR); Gi Cheul Kim, Daejeon (KR); Hyeon Choi, Daejeon (KR); Hyo Sook Joo, Daejeon (KR); Ju Eun Kim, Daejeon (KR)

(73) Assignee: LG Chem, Ltd.

( * ) Notice: Subject to any disclaimer, the term of this patent is extended or adjusted under 35 U.S.C. 154(b) by 210 days.

(21) Appl. No.: 16/630,292

(22) PCT Filed: Aug. 17, 2018

(86) PCT No.: PCT/KR2018/009472
§ 371 (c)(1),
(2) Date: Jan. 10, 2020

(87) PCT Pub. No.: WO2019/039800
PCT Pub. Date: Feb. 28, 2019

(65) Prior Publication Data
US 2020/0164345 A1 May 28, 2020

(30) Foreign Application Priority Data
Aug. 22, 2017 (KR) .................. 10-2017-0105814

(51) Int. Cl.
*B01J 20/26* (2006.01)
*B01J 20/30* (2006.01)
(Continued)

(52) U.S. Cl.
CPC .......... *B01J 20/267* (2013.01); *B01J 20/103* (2013.01); *B01J 20/24* (2013.01); *B01J 20/261* (2013.01);
(Continued)

(58) Field of Classification Search
None
See application file for complete search history.

(56) References Cited

U.S. PATENT DOCUMENTS

| 6,071,549 A | 6/2000 | Hansen |
| 7,645,806 B2 | 1/2010 | Weerawarna et al. |
(Continued)

FOREIGN PATENT DOCUMENTS

| EP | 3248991 A1 | 11/2017 |
| EP | 3249002 A1 | 11/2017 |
(Continued)

OTHER PUBLICATIONS

Extended European Search Report including Written Opinion for Application No. EP18847986.9 dated May 11, 2020, 7 pages.
(Continued)

*Primary Examiner* — Joseph D Anthony
(74) *Attorney, Agent, or Firm* — Lerner, David, Littenberg, Krumholz & Mentlik, LLP

(57) ABSTRACT

The present disclosure relates to a preparation method for a super absorbent polymer sheet and a super absorbent polymer sheet prepared therefrom. According to the preparation method of the present disclosure, a porous super absorbent polymer sheet can be prepared by a simplified process.

11 Claims, 2 Drawing Sheets

Example 1

(51) Int. Cl.
  *B01J 20/28* (2006.01)
  *B01J 20/10* (2006.01)
  *B01J 20/24* (2006.01)

(52) U.S. Cl.
  CPC ... *B01J 20/28033* (2013.01); *B01J 20/28095* (2013.01); *B01J 20/3007* (2013.01); *B01J 20/3085* (2013.01)

(56) References Cited

U.S. PATENT DOCUMENTS

| | | | |
|---|---|---|---|
| 8,641,869 B2 | 2/2014 | Weerawarna | |
| 9,162,007 B2 | 10/2015 | Bitis et al. | |
| 2014/0054497 A1 | 2/2014 | Wattebled et al. | |
| 2015/0314034 A1* | 11/2015 | Horner | C08J 7/08 252/194 |
| 2017/0166716 A1* | 6/2017 | Yen | B65B 25/001 |
| 2018/0037686 A1* | 2/2018 | Lee | C08J 3/075 |
| 2018/0228671 A1* | 8/2018 | Hwang | A61L 15/42 |
| 2018/0265646 A1* | 9/2018 | Nam | C08L 33/06 |
| 2019/0134603 A1* | 5/2019 | Kim | B01J 20/3282 |
| 2019/0135992 A1* | 5/2019 | Seong | C08J 3/245 |
| 2020/0010624 A1* | 1/2020 | Nam | A61L 15/60 |
| 2020/0122119 A1* | 4/2020 | Jeong | C08F 220/06 |

FOREIGN PATENT DOCUMENTS

| | | |
|---|---|---|
| JP | H11170414 A | 6/1999 |
| JP | H11335404 A | 12/1999 |
| JP | 3704155 B2 | 10/2005 |
| JP | 2016508167 A | 3/2016 |
| JP | 2016079269 A | 5/2016 |
| KR | 930012837 A | 7/1993 |
| KR | 20140026506 A | 3/2014 |
| KR | 101430923 B1 | 8/2014 |
| KR | 20170005628 A | 1/2017 |
| KR | 20170020113 A | 2/2017 |
| KR | 20170090185 A | 8/2017 |

OTHER PUBLICATIONS

Hosseinzadeh, et al., "Preparation and Swelling Behaviour of Carboxymethylcellulose-g-Poly(sodium acrylate)/Kaolin Super Absorbent Hydrogel Composites," Asian Journal of Chemistry, Sep. 9, 2012, pp. 85-88. vol. 24, No. 1.
International Search Report with written opinion for Application No. PCT/KR2018/009472 dated Dec. 5, 2018, 7 pages.
Odian, George G., Principles of Polymerization, Second Edition, A Wiley-Interscience Publication, John Wiley & Sons, Copyright 1981, p. 203.
Schwalm, Reinhold, UV Coatings Basics, Recent Developmentsand New Applications, Elsevier Science, Dec. 21, 2006, p. 115.

* cited by examiner

Example 1

Example 2

PREPARATION METHOD FOR SUPER ABSORBENT POLYMER SHEET, SUPER ABSORBENT POLYMER SHEET PREPARED THEREFROM

CROSS-REFERENCE TO RELATED APPLICATIONS

The present application is a national phase entry under 35 U.S.C. § 371 of International Application No. PCT/KR2018/009472, filed on Aug. 17, 2018, which claims priority from Korean Patent Application No. 10-2017-0105814 filed on Aug. 22, 2017, the disclosures of which are incorporated herein by reference in their entirety.

BACKGROUND OF THE INVENTION

(A) Field of the Invention

The present disclosure relates to a preparation method of a super absorbent polymer sheet and a super absorbent polymer sheet prepared therefrom.

(b) Description of the Related Art

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products such as disposable diapers for children, sanitary napkins, etc., but also for water retaining soil products for gardening, water stop materials for the civil engineering and construction, sheets for raising seedling, fresh-keeping agents for food distribution fields, materials for poultices, or the like.

In general, hygiene products such as various diapers, sanitary napkins, or pads for urinary incontinence include an absorber containing super absorbent polymer particles. It was common that the absorber mainly includes the super absorbent polymer particles and fluff pulp to properly fasten the super absorbent polymer particles while maintaining the shape of the absorber and hygiene products.

However, due to the presence of the fluff pulp, it was difficult to make the absorber and hygiene products slim and thin, and there was a problem such as poor wearability in which wearer's skin against the hygiene product becomes sweaty. Moreover, the necessity of using a large amount of the fluff pulp, which is mainly obtained from wood as a raw material, has been contrary to the recent environmental protection trend, and it has become one of the main reasons to increase manufacturing costs of the absorbent layer and the hygiene products.

Therefore, in the absorbent layer and the hygiene products industry, many attempts have been made to reduce the amount of fluff pulp used or to provide hygiene products such as so-called pulpless diapers without using the fluff pulp.

However, research on a super absorbent polymer which can be used as a pulpless absorber without deterioration of the absorption performance, and a preparation method thereof is still required.

PRIOR ART DOCUMENTS

Patent Documents

JP Publication No. 2016-079269

SUMMARY OF THE INVENTION

In order to solve the above problems, the present disclosure provides a preparation method of a super absorbent polymer sheet and a super absorbent polymer sheet prepared therefrom.

In order to solve the above problems, one aspect of the present disclosure provides a preparation method for a super absorbent polymer sheet, including the steps of:

preparing a monomer composition including a water-soluble ethylene-based unsaturated monomer having at least partially neutralized acidic groups, a polymerization initiator, an internal cross-linking agent, a foam stabilizer, an ionic polymeric binder, and an inorganic filler;

preparing a hydrogel polymer by thermal polymerization or photopolymerization of the monomer composition;

drying the hydrogel polymer to form a super absorbent polymer; and forming the super absorbent polymer into a sheet form.

Another aspect of the present disclosure provides a super absorbent polymer sheet prepared according to the above preparation method.

According to the preparation method of a super absorbent polymer sheet of the present disclosure, a porous super absorbent polymer sheet can be prepared by a simplified process.

In addition, the super absorbent polymer sheet prepared according to the preparation method of the present disclosure has an open pore channel structure in which pores are connected to each other, so that absorption of water by capillary pressure is possible, thereby improving absorption rate and permeability.

Further, the super absorbent polymer sheet can be used as a pulpless absorber.

DETAILED DESCRIPTION OF THE EMBODIMENTS

Figure 1:
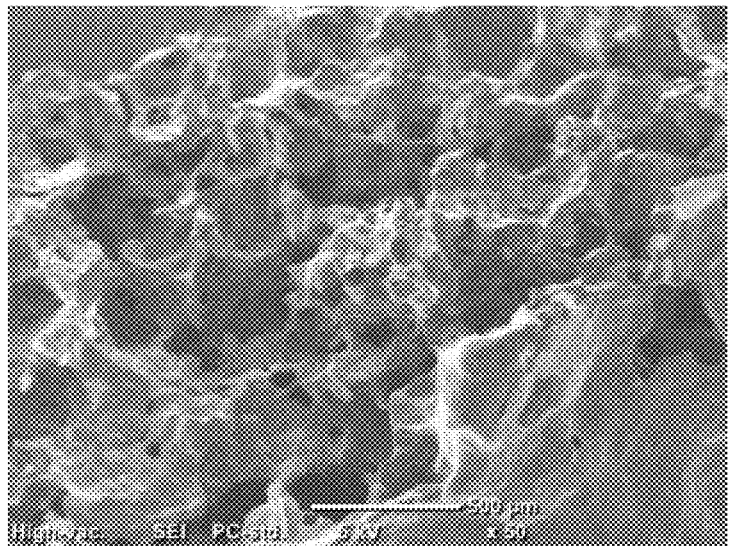
FIGS. 1 to 3 are scanning electron microscope (SEM) photographs of the super absorbent polymer sheet according to Examples of the present disclosure.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the preparation method for a super absorbent polymer sheet according to one embodiment of the present disclosure and the super absorbent polymer sheet prepared therefrom will be described in more detail.

One embodiment of the present disclosure provides a preparation method of a super absorbent polymer sheet, including the steps of:

preparing a monomer composition including a water-soluble ethylene-based unsaturated monomer having at least partially neutralized acidic groups, a polymerization initiator, an internal cross-linking agent, a foam stabilizer, an ionic polymeric binder, and an inorganic filler;

preparing a hydrogel polymer by thermal polymerization or photopolymerization of the monomer composition;

drying the hydrogel polymer to form a super absorbent polymer; and forming the super absorbent polymer into a sheet form.

The water-soluble ethylene-based unsaturated monomer may be used without a limitation as long as it is a monomer generally used in preparation of the super absorbent polymer. The water-soluble ethylene-based unsaturated monomer may use at least any one selected from the group consisting of anionic monomers and their salts, nonionic hydrophilic monomers, amino-containing unsaturated monomers and their quarternary compounds.

Specifically, the water-soluble ethylene-based unsaturated monomer may include at least one selected from the group consisting of anionic monomers such as (meth)acrylic acid, maleic anhydride, fumalic acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid, and a salt thereof; nonionic hydrophilic monomers such as (meth)acrylamide, N-substituted (meth)acrylate, 2-hydroxyethyl (meth)acrylate, 2-hydroxypropyl(meth)acrylate, methoxypolyethyleneglycol(meth)acrylate, or polyethyleneglycol (meth)acrylate; and amino-containing unsaturated monomers such as (N,N)-dimethylaminoethyl(meth)acrylate or (N,N)-dimethylaminopropyl(meth)acrylamid, and a quaternary compound thereof.

More preferably, acrylic acid or salts thereof, for example, acrylic acid or alkali metal salts thereof such as sodium salts, may be used. By using the monomer, it becomes possible to prepare a super absorbent polymer having superior physical properties. When the alkali metal salt of acrylic acid is used as the monomer, it is possible to use acrylic acid after neutralizing the same with a basic compound such as sodium hydroxide (NaOH).

Herein, the acrylic acid-based monomers may be those having acidic groups which are at least partially neutralized. Preferably, the monomers may be those partially neutralized with an alkali substance such as sodium hydroxide, potassium hydroxide, ammonium hydroxide, or the like. In this regard, a degree of neutralization of the acrylic acid-based monomer may be 70 to 98 mol %, 70 to 95 mol %, 75 to 95 mol %, or 80 to 95 mol %. The degree of the neutralization may vary depending on the final physical properties. An excessively high degree of neutralization causes the neutralized monomers to be precipitated, and thus polymerization may not readily occur, whereas an excessively low degree of neutralization not only deteriorates the absorbency of the polymer, but also endows the polymer with hard-to-handle properties, such as those of an elastic rubber.

The degree of neutralization of the acrylic acid-based monomer in the general solution polymerization is 40 to 60 mol %, while the degree of neutralization of the acrylic acid-based monomer of the present disclosure is preferably at least 70 mol %, which is higher. When the degree of neutralization is as high as 70 mol % or more, precipitation occurs due to supersaturation of the alkali substance and viscosity increases due to the precipitation, thereby facilitating pore formation.

In the monomer composition including the water-soluble ethylene-based unsaturated monomer, the concentration of the water-soluble ethylene-based unsaturated monomer may be about 20 to 60 wt %, or about 40 to 50 wt % based on the monomer composition including the raw materials described below and a solvent, and properly controlled in consideration of polymerization time and reaction conditions.

In the preparation method of a super absorbent polymer of the present disclosure, a polymerization initiator that has been generally used for preparing a super absorbent polymer can be applied without particular limitations.

Specifically, the polymerization initiator may be an initiator for thermal polymerization or an initiator for photopolymerization by UV radiation according to the polymerization method. However, even when the photopolymerization method is applied thereto, a certain amount heat is generated by UV radiation and the like, and some heat occurs as the polymerization reaction, an exothermal reaction, progresses. Therefore, the composition may additionally include the thermal polymerization initiator.

Here, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial Lucirin TPO, namely, 2,4,6-trimethyl-benzoyl-trimethyl phosphine oxide, may be used. More various photopolymerization initiators are well disclosed in "UV Coatings: Basics, Recent Developments and New Application (Elsevier, 2007)" written by Reinhold Schwalm, p 115, and the present invention is not limited thereto.

The concentration of the photopolymerization initiator in the monomer composition may be about 0.01 to about 1.0 wt %. When the concentration of the photopolymerization initiator is excessively low, the polymerization rate may become slow, and when the concentration is excessively high, the molecular weight of the super absorbent polymer may become low and the properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH_4)_2S_2O_8$), and the like may be used as examples of the persulfate-based initiators; and 2,2-azobis-(2-amidinopropane)dihydrochloride, 2,2-azobis-(N,N-dimethylene)isobutyramidinedihydrochloride, 2-(carbamoylazo)isobutyronitrile, 2,2-azobis-[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present invention is not limited thereto.

The concentration of the thermal polymerization initiator included in the monomer composition may be about 0.001 to about 0.5 wt %. When the concentration of the thermal polymerization initiator is excessively low, additional thermal polymerization hardly occurs and there may be less effect according to the addition of the thermal polymerization initiator. When the concentration of the thermal polymerization initiator is excessively high, the molecular weight of the super absorbent polymer may become low and the properties may be uneven.

The monomer composition includes an internal cross-linking agent as a raw material of the super absorbent polymer.

The internal cross-linking agent may be a cross-linking agent having one or more ethylene-based unsaturated groups in addition to the functional group which may react with the water-soluble substituents of the water-soluble ethylene-based unsaturated monomer; or a cross-linking agent having two or more functional groups which may react with the water-soluble substituents of the monomer and/or the water-soluble substituents formed by hydrolysis of the monomer.

As the specific example of the internal crosslinking agent, a C8-C12 bisacrylamide, bismethacrylamide, a poly(meth)acrylate of C2-C10 polyol, a poly(meth)allylether of C2-C10 polyol, or the like may be used. More specifically, one or more agents selected from the group consisting of N,N'-methylenebis(meth)acrylate, ethyleneoxy(meth)acrylate, polyethyleneoxy(meth)acrylate, propyleneoxy(meth)acrylate, glycerin diacrylate, glycerin triacrylate, trimethylol triacrylate, triallylamine, triarylcyanurate, triallylisocyanate, polyethyleneglycol, diethyleneglycol, and propyleneglycol may be used.

This internal cross-linking agent may be included at a concentration of about 0.01 to about 0.5 wt % based on the monomer composition, so that the polymerized polymer can be cross-linked.

The monomer composition includes a foam stabilizer.

The foam stabilizer helps to form more stable bubbles by lowering the surface tension in the polymerization, and the super absorbent polymer sheet to be polymerized including the same can exhibit open pore characteristics.

The foam stabilizer may be sodium dodecyl sulfate, oleth carboxylic acid, sodium dodecanoate, or oleyl phosphate, but the present disclosure is not limited thereto.

In addition, the foam stabilizer may be included in an amount of about 0.1 to about 5 parts by weight, preferably about 0.3 to about 1.5 parts by weight based on 100 parts by weight of the water-soluble ethylene-based unsaturated monomer. When the foam stabilizer is included in an excessively large amount, bubbles may be generated too much, thereby decreasing the density of the super absorbent polymer sheet to be prepared. When the foam stabilizer is included in an excessively small amount, the amount of bubbles formed may be small, so that formation of open pores may be difficult. Therefore, it may be preferable to include the foam stabilizer within the above range.

The monomer composition includes an ionic polymeric binder.

The ionic polymeric binder refers to a polymeric compound, not a single molecule, having a chargeable ionic functional group.

The ionic polymer binder contained in the monomer composition serves as a binder in the polymerization to form a matrix, and the super absorbent polymer sheet thus prepared may exhibit properties similar to those of an elastomer.

According to one embodiment of the present disclosure, the ionic polymeric binder may include at least one functional group selected from the group consisting of carboxylate, phosphate, sulfate, and sulfonate.

According to one embodiment of the present disclosure, the ionic polymeric binder may be carboxymethyl cellulose (CMC) or poly(sodium-4-styrene sulfonate.

In addition, according to one embodiment of the present disclosure, the ionic polymeric binder may have a weight average molecular weight (Mw) of about 50,000 to about 500,000 g/mol, preferably about 100,000 to about 200,000 g/mol. When the weight average molecular weight of the ionic polymer binder is excessively small, it may not sufficiently function as a binder. When the weight average molecular weight is excessively large, viscosity may be greatly increased and solubility in the monomer composition may be low. Therefore, it may be preferable to include the ionic polymeric binder having the weight average molecular weight within the above range.

Moreover, the ionic polymeric binder may be included in an amount of about 0.1 to 3 parts by weight, preferably about 0.3 to 1.0 part by weight based on 100 parts by weight of the water-soluble ethylene-based unsaturated monomer in the monomer composition. When the ionic polymer binder is included in an excessively large amount, absorption property of the super absorbent polymer sheet prepared may be lowered, and when in an excessively small amount, the effect obtained by including the binder may be insignificant. Therefore, it may be preferable to include the ionic polymeric binder within the above range.

The monomer composition includes an inorganic filler.

The inorganic filler included in the monomer composition serves as a support in the polymerization. Thus, the super absorbent polymer sheet prepared according to the present disclosure can exhibit improved strength.

According to one embodiment of the present disclosure, the inorganic filler may be porous inorganic particles such as silica, clay, alumina, silica-alumina composite, nano silica, titania, zinc oxide, aluminum sulfate and the like.

In addition, the inorganic filler may be included in an amount of about 0.5 to about 20 parts by weight, preferably about 3 to about 10 parts by weight based on 100 parts by weight of the water-soluble ethylene-based unsaturated monomer included in the monomer composition. When the inorganic filler is included too much, flexibility of the prepared super absorbent polymer sheet may be deteriorated, and when too little, strength may be lowered. Therefore, it may be preferable to include the inorganic filler within the above range.

In the preparation method of the present disclosure, the monomer composition may include an additive such as a thickener, a plasticizer, a preservation stabilizer, an antioxidant, and the like, if necessary.

The raw materials such as the water-soluble ethylene-based unsaturated monomer, the polymerization initiator, the internal cross-linking agent, the foam stabilizer, the ionic polymeric binder, the inorganic filler and the additive may be prepared in the form of a monomer composition solution dissolved in a solvent. The solvent may be included in the monomer composition at a residual quantity except for the above components.

At this time, any solvent which can dissolve the components may be used without limitation, and for example, one or more solvents selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, and the like may be used solely or in combination.

Subsequently, a hydrogel polymer is prepared by thermal polymerization or photopolymerization of the monomer composition.

Meanwhile, the method of preparing the hydrogel polymer by thermal polymerization or photopolymerization of the monomer composition is not particularly limited if it is a common polymerization method for preparing a super absorbent polymer.

Specifically, the polymerization method is largely divided into the thermal polymerization and the photopolymerization according to the energy source of the polymerization. In the case of thermal polymerization, it is generally carried out in a reactor having a kneading spindle, such as a kneader. In the case of photopolymerization, it may be carried out in a reactor equipped with a movable conveyor belt. However, the polymerization method is just an example, and the present invention is not limited thereto.

Generally, the moisture content of the hydrogel polymer obtained by the above method may be about 40 to about 80 wt %. At this time, "moisture content" in the present description is the content of moisture in the entire weight of the hydrogel polymer, and it means a value of which the weight of the dried polymer is subtracted from the weight of the hydrogel polymer. Specifically, the moisture content is defined as a value calculated from the weight loss due to moisture evaporation from the polymer in the process of increasing the temperature of the polymer and drying the same through infrared heating. At this time, the drying condition for measuring the moisture content is that the temperature is increased to about 180° C. and maintained at 180° C., and the total drying time is 20 min including 5 min of a heating step.

Subsequently, a super absorbent polymer, which is a base resin, is formed by drying the hydrogel polymer.

In drying the hydrogel polymer, a coarse pulverizing step may be further included before the drying step for increasing the drying efficiency, if necessary.

Herein, the pulverizing machine used is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

In the coarse pulverizing step, the hydrogel polymer may be crushed to have a diameter of about 2 to about 10 mm.

It is technically difficult to pulverize the hydrogel polymer to have a diameter of less than 2 mm because of its high moisture content, and there may be a phenomenon that the crushed particles cohere with each other. Meanwhile, when the polymer is crushed to have a diameter of larger than 10 mm, the efficiency enhancing effect in the subsequent drying step may be low.

The hydrogel polymer coarsely pulverized as above or the hydrogel polymer immediately after the polymerization without the coarse pulverizing step is subjected to drying. At this time, the drying temperature of the drying step may be about 120 to about 250° C. When the drying temperature is lower than about 120° C., the drying time may become excessively long and the properties of the super absorbent polymer finally prepared may decrease. And when the drying temperature is higher than about 250° C., the surface of the polymer is excessively dried, and the properties of the super absorbent polymer finally prepared may decrease. Therefore, the drying process may be preferably carried out at a temperature of about 120 to about 250° C., more preferably at a temperature of about 140 to about 200° C.

Furthermore, the drying time may be about 20 to about 90 minutes in consideration of process efficiency, but it is not limited thereto.

The drying method in the drying step is not particularly limited if it has been generally used in the drying process of the hydrogel polymer. Specifically, the drying step may be carried out by the method of hot air provision, infrared radiation, microwave radiation, UV ray radiation, and the like. The moisture content of the polymer after the drying step may be about 0.1 to about 10 wt %.

Subsequently, the super absorbent polymer is formed into a sheet form according to a conventional method in the technical field of the present disclosure.

According to one embodiment of the present disclosure, the super absorbent polymer sheet may have a thickness of about 100 μm or more, 1,000 μm or more or 5,000 μm or more, and about 10 cm or less, about 5 cm or less, or about 1 cm or less. When the thickness of the super absorbent polymer sheet is excessively thin, strength may be low to make the sheet torn. When it is excessively thick, drying and processing may be difficult. From this point of view, it may be preferable to make the thickness within the range described above.

According to the preparation method of a super absorbent polymer sheet of the present disclosure, since the super absorbent polymer sheet is in a sheet form with an open pore channel structure in which at least a part of pores are connected to each other, absorption of water by capillary pressure is possible, so that absorption rate and permeability are improved. Therefore, the super absorbent polymer sheet can be provided as a pulpless absorber.

According to another embodiment of the present disclosure, a super absorbent polymer sheet prepared by the above preparation method is provided.

The super absorbent polymer sheet has an open pore channel structure in which at least a part of pores are connected to each other, so that absorption of water by capillary pressure is possible. Accordingly, absorption rate and permeability can be improved as compared with the conventional powdery super absorbent polymer.

In addition, according to one embodiment of the present disclosure, the super absorbent polymer sheet may have a porosity of about 25 to about 80%. When the porosity of the super absorbent polymer sheet is too small, it is difficult to form open pores. When the porosity of the super absorbent polymer sheet is too large, formation of sheets may be difficult due to low strength. From this point of view, it may be preferable to have the porosity within the range described above.

In addition, the super absorbent polymer sheet may have centrifuge retention capacity (CRC) of about 5 to about 35 g/g, preferably about 10 to about 25 g/g, measured in accordance with EDANA WSP 241.2.

Moreover, the super absorbent polymer sheet may have absorbency under load (AUL) at 0.3 psi of about 5 to about 35 g/g, preferably about 11 to about 25 g/g, measured in accordance with EDANA WSP 242.2.

As described above, the super absorbent polymer sheet of the present disclosure has excellent absorption properties and permeability, and can be used as a pulpless absorber.

Hereinafter, the function and effect of the present invention will be described in more detail through specific examples of the present invention. However, these examples are for illustrative purposes only, and the invention is not intended to be limited by these examples.

EXAMPLES

Example 1

35.32 g of acrylic acid, 50.5 g of sodium hydroxide (NaOH, 30 wt % solution) and 7.76 g of water were mixed to prepare a neutralized solution in which about 80 mol % of the acrylic acid was neutralized.

2850 ppm of polyethylene glycol diacrylate (Mw=400) as an internal cross-linking agent, 0.11 g of sodium lauryl sulfate (SDS), 0.11 g of oleth carboxylic acid, 0.11 g of sodium bicarbonate, 0.2 g of carboxymethyl cellulose (Mw=150,000), 0.2 g of poly(sodium-4-styrene sulfonate (Mw=200,000), 0.14 g of sodium peroxydisulfate (SPS), and 3.2 g of silica particles surface-modified with hydroxyl groups (30 wt %, colloidal silica having a particle diameter of 12 nm and a specific surface area of 200 $m^2/g$) were added to the neutralized solution to prepare a monomer composition.

The monomer composition was high-shear blended for about 60 minutes at 5,000 rpm using a mechanical mixer.

Thereafter, the mixture was added through a feeder of a polymerization reactor to carry out polymerization to form a hydrogel polymer. At this time, the temperature of the polymerization reactor was kept at 100° C., the maximum temperature during the polymerization was 110° C., and the polymerization was performed for 10 minutes. Subsequently, the hydrogel polymer was dried in a hot-air drier at 140° C. for 30 minutes, and cut into a sheet form (thickness: 500 μm, porosity: 30%) using a cutter.

Example 2

A super absorbent polymer sheet was prepared in the same manner as in Example 1, except that 5700 ppm of the polyethylene glycol diacrylate (Mw=400) was used as an internal cross-linking agent.

Example 3

A super absorbent polymer sheet was prepared in the same manner as in Example 1, except that 8550 ppm of the polyethylene glycol diacrylate (Mw=400) was used as an internal cross-linking agent.

Comparative Example 1

A super absorbent polymer sheet was prepared in the same manner as in Example 1, except that 0.2 g of PEO (Mw=300,000) was used as a polymeric binder in place of the carboxymethyl cellulose and poly(sodium-4-styrene sulfonate.

Experimental Examples

Figure 2:
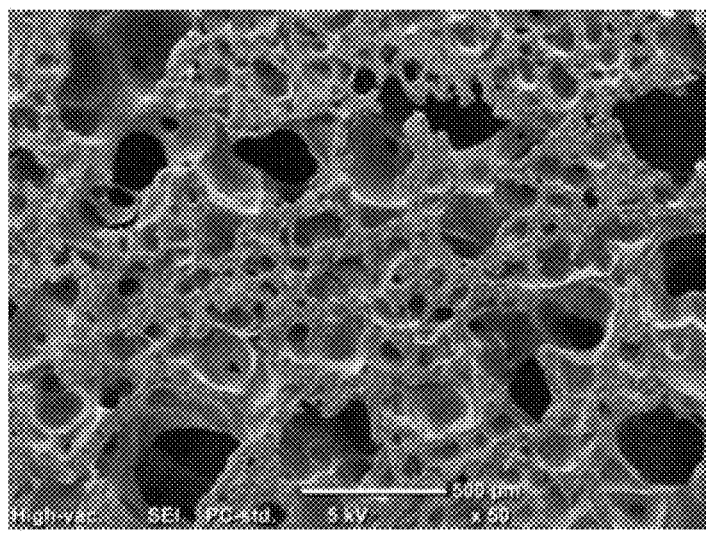
Figure 3:
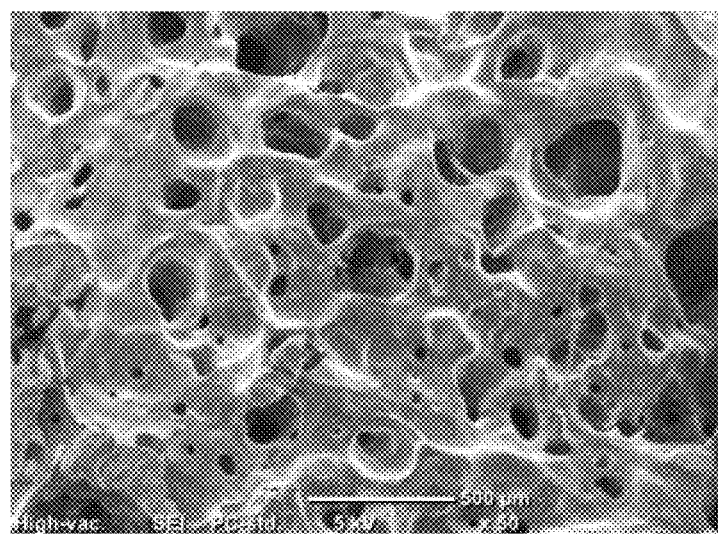

Evaluation of Characteristics of the Super Absorbent Polymer Sheet (1) Surface of the Super Absorbent Polymer Sheet Scanning electron microscope (SEM) photographs of the surface of the super absorbent polymer sheet according to Examples 1 to 3 of the present disclosure are shown in FIGS. 1 to 3, respectively.

Figure 4:
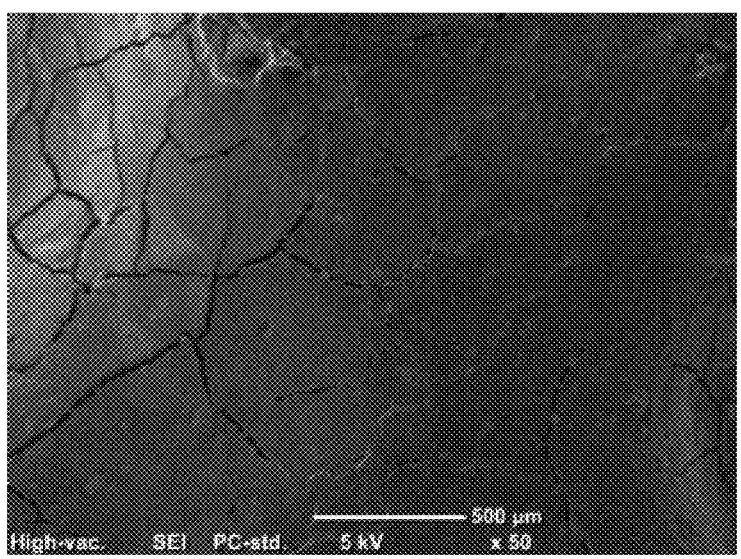
FIG. 4 is a scanning electron microscope (SEM) photograph of the super absorbent polymer sheet according to Comparative Example of the present disclosure.

In addition, a scanning electron microscope (SEM) photograph of the surface of the super absorbent polymer sheet according to Comparative Example 1 of the present disclosure is shown in FIG. 4.

Comparing FIGS. 1 to 3 with FIG. 4, it was confirmed that an open pore channel structure is formed on the surface of the super absorbent polymer sheet according to Examples 1 to 3 of the present disclosure from FIGS. 1 to 3, whereas such a structure was not observed in FIG. 4.

(2) Centrifuge Retention Capacity (CRC)

The CRC of each super absorbent polymer sheet prepared in Examples and Comparative Example was measured in accordance with EDANA WSP 241.2.

Specifically, a super absorbent polymer having a particle diameter of 300 to 600 μm, which is passed through a US standard 30 mesh screen and is kept on a US standard 50 mesh screen, was prepared from a super absorbent polymer to be tested for centrifugal retention capacity.

Thereafter, $W_0(g)$ (about 0.2 g) of the super absorbent polymer having a particle diameter of 300 to 600 μm was uniformly placed into a non-woven bag, and sealed. Then, it was immersed in physiological saline (0.9 wt %) at room temperature. After 30 minutes, water was drained from the bag by centrifugal device under the condition of 250 G for 3 minutes, and the weight $W_2(g)$ of the bag was measured. In addition, the same manipulation was performed for an empty bag without the super absorbent polymer, and the weight $W_1(g)$ of the bag was measured.

The CRC (g/g) was calculated by using the obtained weight values according to the following Equation 1.

$$CRC(g/g)=\{[W_2(g)-W_1(g)]/W_0(g)\}-1 \quad \text{[Equation 1]}$$

In Equation 1, $W_0(g)$ is an initial weight (g) of the super absorbent polymer having a particle diameter of 300 to 600 μm, $W_1(g)$ is a weight of the apparatus measured after dehydrating the same by using a centrifuge at 250 G for 3 min without using the super absorbent polymer, and $W_2(g)$ is a weight of the device with the superabsorbent polymer measured after immersing the super absorbent polymer in a 0.9 wt % saline solution for 30 min at room temperature and dehydrating the same by using a centrifuge at 250 G for 3 min.

(3) Absorbency Under Load (AUL)

The AUL at 0.3 psi of each super absorbent polymer sheet prepared in Examples and Comparative Example was measured in accordance with EDANA WSP 242.2.

Specifically, a 400 mesh stainless steel screen was installed in a cylindrical bottom of a plastic having an internal diameter of 25 mm $W_0$(g, about 0.16 g) of the super absorbent polymer to be measured was uniformly scattered on the screen at room temperature and a humidity of 50%. Thereafter, a piston which can uniformly provide a load of 0.3 psi was put on the super absorbent polymer. Herein, the external diameter of the piston was slightly smaller than 25 mm, there was no gap between the cylindrical internal wall and the piston, and the jig-jog of the cylinder was not interrupted. At this time, the weight $W_3(g)$ of the device was measured.

Subsequently, a glass filter having a diameter of 90 mm and a thickness of 5 mm was put in a Petri dish having a diameter of 150 mm, and 0.90 wt % physiological saline was poured in the dish. At this time, the physiological saline was poured until the surface level of the saline became equal to the upper surface of the glass filter. One filter paper having a diameter of 90 mm was put thereon.

Thereafter, the prepared device was placed on the filter paper so that the super absorbent polymer in the device was swelled by physiological saline under a load. After one hour, the weight $W_4(g)$ of the device containing the swollen super absorbent polymer was measured.

The AUL was calculated by using the obtained weight values according to the following Equation 2.

$$AUL(g/g) = [W_4(g) - W_3(g)]/W_0(g) \qquad [\text{Equation 2}]$$

In Equation 2, $W_0(g)$ is an initial weight (g) of the super absorbent polymer, $W_3(g)$ is a sum of a weight of the super absorbent polymer and a weight of the device providing a load to the polymer, and $W_4(g)$ is a sum of a weight of the super absorbent polymer and a weight of the device providing a load to the polymer measured after making the super absorbent polymer absorb the saline for one h under a load (0.3 psi).

The properties of the super absorbent polymer sheet prepared in Examples 1-3 and Comparative Example 1 are measured by the above methods and listed in Table 1.

TABLE 1

|  | CRC (g/g) | AUL(0.3 psi, g/g) |
| --- | --- | --- |
| Example 1 | 14.4 | 12.1 |
| Example 2 | 15.1 | 20.8 |
| Example 3 | 17.0 | 25.3 |
| Comparative Example 1 | 5.0 | 10.3 |

Referring to Table 1 and figures, the super absorbent polymer according to the preparation method of the present disclosure has an open pore channel structure and exhibits excellent absorbency.

What is claimed is:

1. A preparation method for a super absorbent polymer sheet, comprising:
   preparing a monomer composition comprising a water-soluble ethylene-based unsaturated monomer having at least partially neutralized acidic groups, a polymerization initiator, an internal cross-linking agent, a foam stabilizer, an ionic polymeric binder, and an inorganic filler;
   preparing a hydrogel polymer by thermal polymerization or photopolymerization of the monomer composition;
   drying the hydrogel polymer to form a super absorbent polymer; and
   forming the super absorbent polymer into a sheet form to produce the super absorbent polymer sheet,
   wherein the super absorbent polymer sheet consists of said formed super absorbent polymer.

2. The preparation method for a super absorbent polymer sheet of claim 1,
   wherein the foam stabilizer comprises at least one of sodium dodecyl sulfate, oleth carboxylic acid, sodium dodecanoate, or oleyl phosphate.

3. The preparation method for a super absorbent polymer sheet of claim 1,
   wherein the foam stabilizer is included in an amount of 0.1 to 5 parts by weight based on 100 parts by weight of the water-soluble ethylene-based unsaturated monomer.

4. The preparation method for a super absorbent polymer sheet of claim 1,
   wherein the ionic polymeric binder comprises at least one functional group selected from the group consisting of carboxylate, phosphate, sulfate, and sulfonate.

5. The preparation method for a super absorbent polymer sheet of claim 4,
   wherein the ionic polymeric binder comprises at least one of carboxymethyl cellulose (CMC), or poly(sodium-4-styrene sulfonate.

6. The preparation method for a super absorbent polymer sheet of claim 1,
   wherein the ionic polymeric binder is included in an amount of 0.1 to 3 parts by weight based on 100 parts by weight of the water-soluble ethylene-based unsaturated monomer.

7. The preparation method for a super absorbent polymer sheet of claim 1,
   wherein the inorganic filler comprises at least one of silica, clay, alumina, silica-alumina composite, nano silica, titania, zinc oxide, or aluminum sulfate.

8. The preparation method for a super absorbent polymer sheet of claim 1,
   wherein the inorganic filler is included in an amount of 0.5 to 20 parts by weight based on 100 parts by weight of the water-soluble ethylene-based unsaturated monomer.

9. The preparation method for a super absorbent polymer sheet of claim 1,
   wherein the water-soluble ethylene-based unsaturated monomer has a degree of neutralization of 70 to 98 mol %.

10. The preparation method for a super absorbent polymer sheet of claim 1,
    wherein the super absorbent polymer sheet has a thickness of 100 μm to 10 cm.

11. The preparation method for a super absorbent polymer sheet of claim 1,
    wherein the super absorbent polymer sheet has a porosity of 25 to 80%.

* * * * *